INVENTOR.
Zoltan Tarczy-Hornoch
BY Fleh and Swain
Attorneys

INVENTOR.
Zoltan Tarczy-Hornoch
BY
Flehr and Swain
Attorneys

United States Patent Office 3,423,676
Patented Jan. 21, 1969

3,423,676
MULTI-STATE DIGITAL INTERPOLATING APPARATUS FOR TIME INTERVAL MEASUREMENTS

Zoltan Tarczy-Hornoch, Berkeley, Calif., assignor to W. K. Rosenberry, doing business as Zeta Research, Lafayette, Calif.

Filed July 2, 1965, Ser. No. 469,158
U.S. Cl. 324—68 7 Claims
Int. Cl. G01r *11/00*

ABSTRACT OF THE DISCLOSURE

The digital interpolating apparatus consists of a plurality of trigger circuits interconnected in a chain to form a multi-stable state circuit, the first trigger circuit triggered by an external trigger pulse. Each additional trigger circuit is triggered in a time ordered sequence by the output of the preceding trigger circuit until the last state is reached, then the external trigger pulse may start the sequence again. A stop pulse causes the multi-stable state circuit to stay in the last assumed stable state thereby making the apparatus suitable for time interval measurements.

This invention relates to a digital interpolating apparatus and method and more particularly to a digital interpolating apparatus and method which can be utilized for making high resolution digital time interval measurements in connection with conventional counting units.

In the past, in making digital time interval measurements, an oscillator or a clock generator was used as the time reference. The oscillator was connected to a counting unit which often was a decimal counting unit through an AND gate. The time interval measurement was accomplished by enabling the AND gate for the duration of the time interval in question and the decimal counting unit counted the clock pulses during this time interval. In making time interval measurements in this manner, the resolution is limited by the clock rate. The clock rate is limited by the switching speed of the switching devices used. In order to achieve higher resolution, higher speed switching devices have been utilized with a corresponding increase in cost, decrease in reliability, and so forth. There is, therefore, a need for a digital interpolating apparatus and method which does not require the use of high resolution switching elements and in which the resolution is not directly limited by the switching speed of the switching devices utilized.

In general, it is an object of the present invention to provide a digital interpolating apparatus and method which overcomes the above named disadvantages.

Another object of the invention is to provide an apparatus and method of the above character in which the ±1 count ambiguity conventionally associated with such devices is reduced to ±½ maximum count error.

Another object of the invention is to provide an apparatus and method of the above character which can have a resolution which is better than would be possible with conventional counting units.

Another object of the invention is to provide an apparatus and method of the above character which can be used in connection with conventional counting units.

Another object of the invention is to provide an apparatus and method of the above character which is repetitively controlled.

Another object of the invention is to provide an apparatus and method of the above character in which a phase-locked oscillator is utilized with a frequency comparable to the switching rate of a single stage of the multi-stable state circuit.

Another object of the invention is to provide an apparatus and method of the above character in which a phase-locked oscillator is utilized with a frequency comparable to the stepping rate of the entire multi-stable state circuit.

Another object of the invention is to provide an apparatus and method of the above character which can accomplish time interpolation with high accuracy.

Another object of the invention is to provide an apparatus and method of the above character in which the stepping rate error is eliminated.

Additional objects and features of the invention will appear from the following description in which the preferred embodiments are set forth in detail in conjunction with the accompanying drawings.

Referring to the drawings.

In general, the digital interpolating apparatus consists of a multi-stable state circuit capable of assuming a fixed number of stable states greater than two in a predetermined sequence. An oscillator is provided for repetitively starting the multi-stable state circuit to cause the multi-stable state circuit to repetitively pass through the predetermined sequence. A control circuit is provided for starting the oscillator at the beginning of the time interval to be measured and for stopping the oscillator and the multi-stable state circuit at the end of the time interval being measured.

Figures 1, 2, 3, 4:
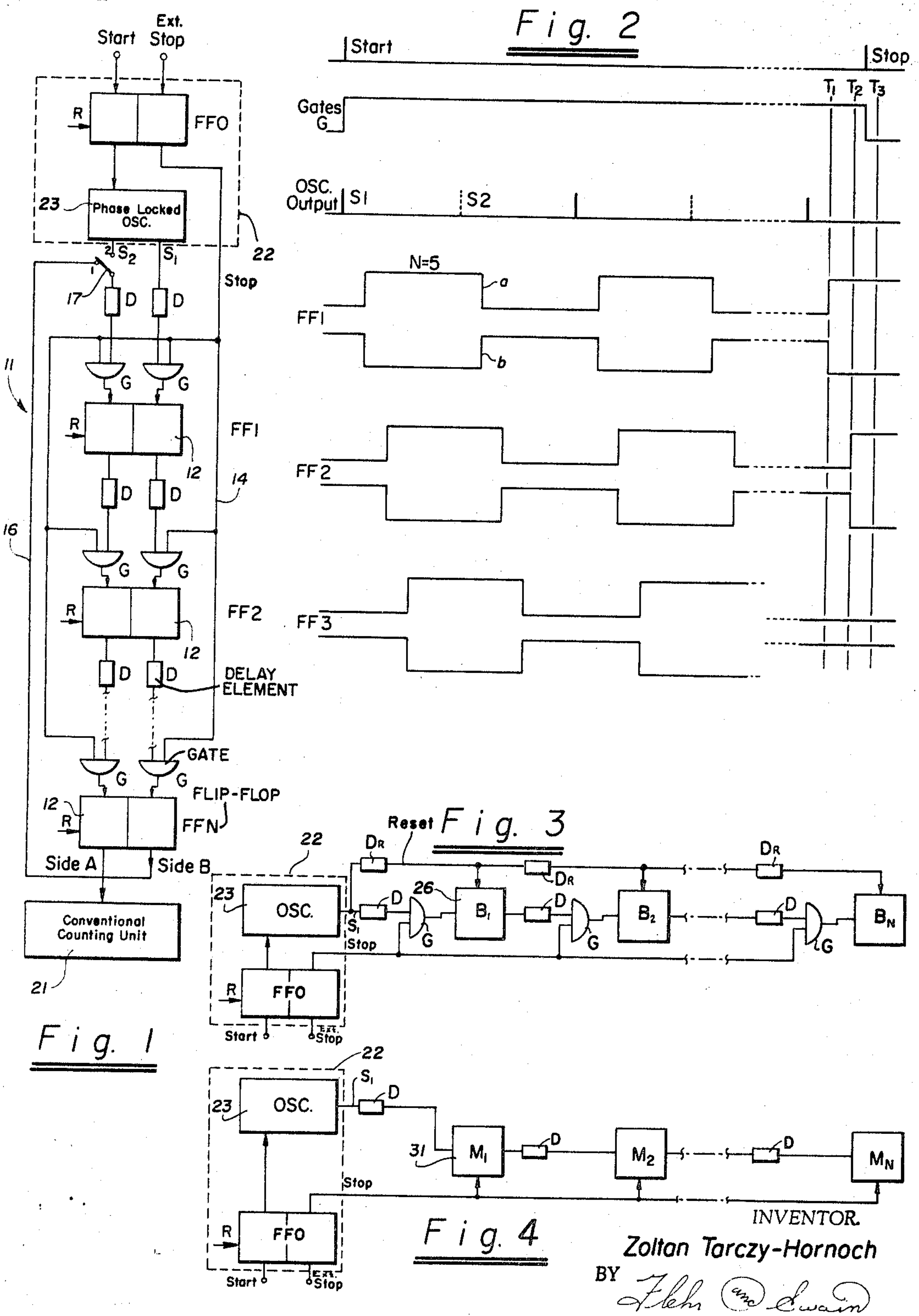
FIGURE 1 is a block diagram of a digital interpolating apparatus incorporating the present invention.
FIGURE 2 is a graph showing voltage-time curves for various parts of the circuitry shown in FIGURE 1.
FIGURE 3 is a block diagram of another embodiment of the digital interpolating apparatus.
FIGURE 4 is a block diagram of still another embodiment of a digital interpolating apparatus.

More in particular, there is shown in FIGURE 1 a block diagram of a digital interpolating apparatus incorporating the present invention. As shown therein, it consists of a multi-stable state circuit 11. The multi-stable state circuit 11 consists of a plurality of stages capable of assuming two states such as flip-flops 12 which are identified FF1, FF2, FF3, etc. . . . FFN. As shown in FIGURE 1, any desired number of flip-flops can be utilized. For example, in making decimal time interval measurements, five flip-flops can be used. Each of the flip-flops has two sides which are identified as side A and side B, respectively. Each of the flip-flops also has one input and one output for each side as shown in FIGURE 1.

Each input of each side of the flip-flop is connected to the output of an AND gate G. One input of each of the AND gates is connected to a delay element D which, except for the first flip-flop FF1, is connected to the output of the same side of the preceding flip-flop. The delay element D can be a delay line, RC delay, or any suitable active or passive delay network. The delay provided by the delay element in each stage preferably are, but need not be, identical. The value of one or more delay elements can be zero. The other input to each of the AND gates is connected to a stop line 14 which is connected to one side of a start-stop flip-flop identified as FF0.

As can be seen, the flip-flops FF1, FF2 . . . FFN are connected in series. Each of the flip-flops is capable of assuming two stable states, and for that reason, since a plurality of flip-flops are utilized, the multi-stable state circuit is capable of assuming a fixed number of stable states which is greater than two.

The output from one side (side B) of the last flip-flop FFN is connected by a conductor 16 to the input of the opposite side of the first flip-flop FF1 through stationary contact 1 of a switch S17. The other side (side A) of the flip-flop FFN is connected to a conventional counting unit 21 of a suitable type such as decimal counters.

Control means 22 is provided for repetitively starting the multi-stable state circuit to cause the multi-stable state circuit to pass through a predetermined sequence and consists of an oscillator 23 and a flip-flop FF0. The oscillator 23 can be of conventional type but preferably it is a phase-locked oscillator. Phase-locked oscillators are known to those skilled in the art; for example, one of the type shown in Figures 4.45 and 4.46 on pages 140–148 of volume XIX of the MIT Series entitled "Waveforms," published by McGraw-Hill Book Company in 1949. Another oscillator which would be particularly suitable for use with the multi-stable state circuit shown in FIGURE 1 is described in copending application Ser. No. 377,825, filed June 25, 1964 and now U.S. Patent No. 3,319,181.

The phase-locked oscillator 23 is provided with two outputs S1 and S2 which are delayed equally with respect to each other. The output S1 is connected to the delay element D connected to the input of side B of flip-flop FF1. The output signal S2 is connected to stationary contact 2 of switch S17 and is adapted to be connected to the delay element D connected to the side A of flip-flop FF1 when the switch is moved from the position shown in FIGURE 1 into engagement with contact 2 for a purpose hereinafter described. Start and stop terminals are connected to the two sides of the flip-flop FF0 as shown in FIGURE 1. A reset signal identified as R is supplied to each of the flip-flops before a measurement is commenced.

Operation of the circuitry shown in FIGURE 1 in performing the method may now be briefly described as follows. Let it be assumed that the flip-flops forming the multi-stable state circuit are all in the same stable state. At the beginning of a time interval, the start signal is applied to the start terminal connected to one side of the flip-flop FF0 to set that flip-flop. This start-stop control flip-flop performs two functions simultaneously. First, it starts the phase-locked oscillator 23 by supplying a signal to the phase-locked oscillator 23. Second, it supplies a signal to all of the AND gates so that the AND gates are enabled to transmit an additional signal from the preceding flip-flop.

Now let it be assumed that the switch S17 is in engagement with the contact 1. In this condition, only one output from the phase-locked oscillator is supplied through the delay line D through the gate G to side B of the flip-flop FF1 to trigger flip-flop FF1 to cause it to be set. Setting of the flip-flop FF1 causes an output to be supplied from side B through the delay line D to the gate G of the succeeding flip-flop to also cause it to be set. This sequence continues until all of the flip-flops in the series chain have been triggered to the set condition in a serial or sequential manner or, in other words, in a predetermined sequence. When the flip-flop FFN is triggered to a set condition, a signal is supplied through the line 16 to side A of flip-flop FF1 to cause it to be triggered to the reset condition. Triggering of the flip-flop FF1 to the reset condition causes sequential triggering in a predetermined sequence of the succeeding flip-flops. When the flip-flop FFN is triggered to the reset condition, a signal is supplied to the conventional counting unit 21 to indicate that all of the flip-flops have gone through two stable states, i.e., set and reset conditions.

After the flip-flop FFN has been triggered into a reset condition, the sequential triggering of the flip-flops ends. Additional sequential triggering of the flip-flops forming the multi-stable state circuitry 11 will only occur when the phase-locked oscillator 23 supplies another pulse on the line S1 to the flip-flop FF1 to cause the same sequence of operations as hereinbefore described to occur. During the time interval being measured, the oscillator 23 causes the multi-stable state circuit to be repeatedly started so that it will travel through its predetermined sequence. This action continues until an external stop signal is supplied to the stop terminal connected to the flip-flop FF0 which triggers the flip-flop FF0 to remove the signal applied to the gates G so that the gates G can no longer pass any additional signals from the preceding flip-flops. In addition, the triggering of the flip-flop FF0 stops the operation of the phase-locked oscillator 23.

A multi-stable state circuit, like circuit 11, may be called a conditionally multi-stable state circuit. It has a plurality of quasi-stable states and a fully-stable last state. Only an external signal, like signal S1 from oscillator 23, can move it from its fully-stable state, but subsequent quasi-stable states are assumed in a self-sustaining sequence. Any one of the quasi-stable states can be converted into a fully-stable state by receipt of a stop signal. Since signal S1 is also disabled by the stop signal, the multi-stable state circuit can also stop in its fully-stable state.

The flip-flops FF1–FFN can be provided with suitable indicating means so as to indicate the condition or state in which they are stopped so that they may be read in conjunction with the output from the conventional counting unit 21 to give an exact measurement of the time interval measured.

A waveform diagram is shown in FIGURE 2. The start and stop signals are shown. The outputs S1 and S2 from the oscillator 23 and the voltage applied to the gate G are also shown. As indicated therein, the voltage to the gate G is supplied with the start pulse and is removed with the receipt of the stop signal. As also shown, the oscillator outputs S1 and S2 are generated commencing with the beginning of the start signal, and continue in a periodic fashion.

The outputs from the flip-flops FF1–FFN are indicated as complementary outputs *a* and *b*. In this figure, it has been assumed that the number of flip-flops is equal to 5. As can be seen from FIGURE 2, each step of the output *a* from the succeeding flip-flop is delayed by an additional increment and after every N increments, a count is supplied to the conventional counting unit 21.

After an integer number of cycles of the type hereinbefore described for the multi-stable state circuit, let it be assumed as shown in FIGURE 2, that at time T1, the flip-flop FF1 switches; at time T2, flip-flop FF2 switches; and at time T3, flip-flop FF3 would switch but cannot because the stop signal has arrived between the times T2 and T3. This means that the last stage which is triggered is the flip-flop FF2. Flip-flop FF3 will remain in the original stable state which is the same as the stable state prior to the last S1 signal. Therefore, after the stop signal is received, the flip-flops FF1–FFN will precisely register and indicate the last stable state of the multi-stable state circuit which existed at the time of the stop pulse. For this reason, it can be seen that the multi-stage state circuit is particularly useful for digital time interval interpolation.

The total elapsed time between the start and stop signals is measured by counting the total number of periods of the phase locked oscillator 23 which can be called the main time quanta. Then the total number of additional flip-flop switching actions occurring before the stop time gives the interpolating time quanta. 2N times the interpolating time quantum should equal one main time quantum where N is equal to the number of stages of the multi-stable state circuit. The sum of the main and interpolating time quanta equals the total measured time.

The number of main time quanta can be counted by a conventional counting unit 21 as shown in FIGURE 1. Instead of counting one condition of the flip-flop FFN, it would be possible to count the number of output signals S1 directly from the phase-locked oscillator 23. However, it should be pointed out that if the S1 pulses are the ones that are being counted, one less than the total number of S1 pulses should be counted. This is necessary because the phase-locked oscillator emits an output signal at the commencement rather than at the conclusion of the main time quanta.

Now let it be assumed that the switch 17 is moved so that it is in engagement with the contact 2. With the switch in this position, both of the signals S1 and S2 from the phase-locked oscillator are used. The operation is very similar to that hereinbefore described. Thus, when a start signal is received, the flip-flop FF0 is set to cause operation of the phase-locked oscillator 23 and to also supply a signal to the gates G. The signal S1 will be applied to one side of first flip-flop FF1, and the signal S2 will be supplied to the other side of the flip-flop FF1 to produce the complementary outputs *a* and *b* shown in FIGURE 2. The additional flip-flops are triggered in sequence as hereinbefore described to provide corresponding complementary outputs. This embodiment of FIGURE 1 can be considered a conditionally multi-stable state circuit with two fully-stable states and two sets of quasi-stable states.

Although the phase-locked oscillator 23 must be slightly more elaborate when two outputs are required, this makes it possible to obtain greater accuracy in making the time interval measurement and, in fact, should reduce any cumulative error by one-half.

The delay elements D connected to each of the inputs of each of the flip-flops have been provided to control the propagation delay from one stage or flip-flop to the succeeding stage or flip-flop. By utilizing these delay elements, it is possible to control and equalize the interpolating time quanta. The interpolating time quantum is the sum of the time delay provided by the delay element and the signal propagation delay through the gate and flip-flop combination.

In making a time interval measurement, it can be seen that if there is variation between the interpolating time quanta, then there can be a large cumulative error after a large number of steps. However, with the present apparatus, the error accumulation is limited to the total error of 2N interpolating time quanta if the phase-locked oscillator drives one side of FF1. This error is reduced by one-half when both sides of FF1 are driven by signals S1 and S2, respectively.

In the foregoing discussion, it has been assumed that the flip-flops shown in FIGURE 1 are conventional bistable elements because they are as easy to set as to reset. In other words, they are symmetrical in operation and in output. Other bistable elements, as is will known to those skilled in the art, are not as symmetrical in operation as, for example, tunnel diodes. However, such devices can be also utilized in the present digital interpolating apparatus. Such a circuit is shown in block diagram in FIGURE 3. The multi-stable state circuit in this case is formed of a plurality of bistable elements 26 of a suitable type such as tunnel diodes which are connected to gates G and delay elements D. Each of the bistable elements is provided with an input and an output. The input is connected to the output of the gate G. The other input of each of the gates G is connected to one side of the flip-flop FF0. A reset signal is supplied from the oscillator 23 through delay elements identified as $D_R$ and which are connected to each of the bistable elements 26. The bistable elements 26 have been identified as $B_1$ to $B_N$.

Operation of the embodiment shown in FIGURE 3 may now be briefly described as follows. Let it be assumed that a start pulse is supplied to the start terminal connected to the flip-flop FF0. This, as explained previously, starts operation of the oscillator 23 and at the same time supplies a signal to the gates G to permit the oscillator output to be passed and the bistable elements 26 to be triggered into the set condition in succession in a predetermined sequence as determined by the manner in which they are connected. If the stop signal arrives within the sequence, the last bistable element triggered and the first one not triggered will give a clear indication of how long the time interval was if the stop signal comes within one full cycle of time after the time of receipt of the start signal. If the stop signal arrives at a later time, then the bistable elements cannot be as easily reset as the flip-flops hereinbefore described. It is for this reason that it is necessary to provide an external reset time from the oscillator through the delay lines $D_R$ which cause the bistable elements 26 to be reset at appropriate times thereby permitting the start of a new set cycle.

In FIGURE 4, there is shown still another embodiment of the present invention which makes use of bistable elements which are conditionally bistable. That is, the bistable device can have one fully-stable state and one quasi-stable state which can be made fully stable by the application of an external signal. By way of example, a conditionally bistable device can be a tunnel diode monostable multivibrator with a stepwise changeable bias level. It is well known to those skilled in the art that such a monostable circuit can be kept in its quasi-stable state indefinitely by applying an appropriate change on the bias level to thereby provide a conditionally bistable device. In FIGURE 4, the conditionally bistable circuits 31 have been identified as $M_1, M_2 \ldots M_N$, respectively. Each of these circuits has an input and an output. The input is connected to delay element D and the output is connected to another delay element D which is connected to the succeeding conditionally bistable circuit. An oscillator 23 is again provided for controlling the repetition rate for the multi-stable state circuit. A start-stop control flip-flop FF0 is also provided. One side has an output which is connected to the oscillator for starting and the other side is connected to the conditionally bistable circuits 31 to provide the external signal for establishing the second stable state.

Operation of the embodiment shown in FIGURE 4 may now be briefly described as follows. When a start signal is received, the oscillator 23 is placed in operation which causes the conditionally bistable circuits 31 to be sequentially set into their quasi-stable state conditions one by one in the predetermined sequence as determined by the manner in which they are serially connected. The conditionally bistable circuits 31 will, after a predetermined known time, return automatically to their fully-stable conditions, permitting the start of a new set cycle starting with the next oscillator output pulse.

This sequence is interrupted when the external stop signal is received which causes a signal to be supplied to the conditionally bistable circuits to cause those in the quasi-stable state to change that state into a second stable state.

Figure 5:
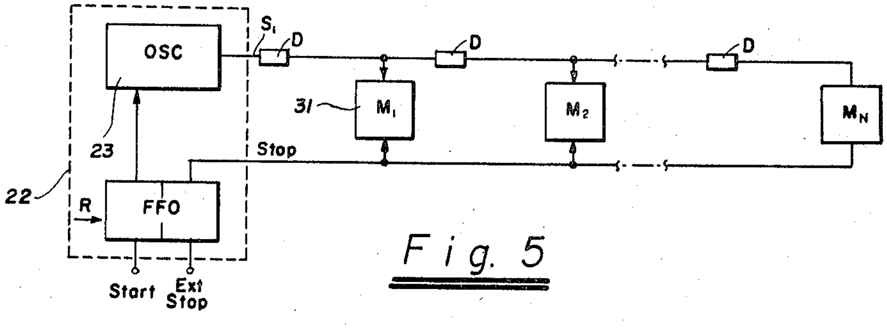
FIGURE 5 is a block diagram of a still further embodiment of the digital interpolating apparatus.

FIGURE 5 is an embodiment similar to that shown in FIGURE 4 with the exception that the conditionally bistable circuits $M_1, M_2 \ldots M_N$ are triggered from the oscillator 23 through the delays D. In this embodiment, the delays cannot be zero because the switching delay of the conditionally bistable circuit itself is not part of the total delay as in the embodiments hereinbefore described. The embodiment shown in FIGURE 5 has an advantage over the embodiment shown in FIGURE 4 in that it is less dependent on the switching speed of the conditionally bistable circuits.

In the previous embodiments shown in FIGURES 1, 3, 4 and 5, it is assumed that the number of main time quanta is determined by counting the switching cycles of the last bistable or conditionally bistable circuit or one less than the number of output pulses S1 from the oscillator as explained in connection with the embodiment shown on FIGURE 1.

Figure 6:
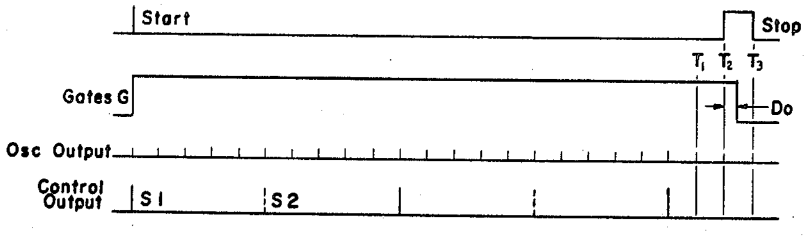
FIGURE 6 is a graph showing voltage-time curves for additional embodiments of the present invention.

In the embodiments hereinbefore described, it was assumed that the phase-locked oscillator 23 operates at a frequency corresponding to the main time quanta. It is also possible to operate oscillator 23 at an integer times higher frequency corresponding to the interpolating time quanta as shown in FIGURE 6. The scale of FIGURE 6 is the same as the scale of FIGURE 1. An appropriate divider circuit such as an analog countdown circuit may be used to divide the oscillator output and provide output S1 or S1 and S2 corresponding to the main time quanta as also shown on time diagram, FIGURE 6. Such divider circuits are well known in the state of the art and it can be similar to the circuit shown in FIGURE 16.32 on page 601 of "Waveforms," supra.

Figure 7:
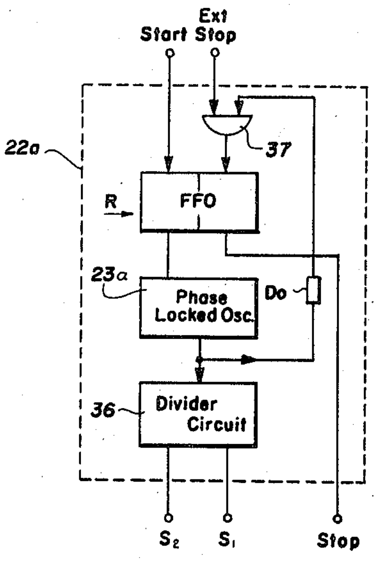
FIGURE 7 is another embodiment of the control means used in FIGURES 1, 3, 4 and 5.

The combination of flip-flop FF0, phase-locked oscillator 23 and the divider circuit 36 together with the delay $D_0$ and gate 37 form control circuit 22a as shown in FIGURE 7.

The function of FF0 is the same as in contra circuit 22. Phase-locked oscillator 23a, together with divider circuit 36, gives the same S1 and S2 outputs as the phase-locked oscillator 23 in control circuit 22. In addition, the output of phase-locked oscillator 23a is connected through delay $D_0$ to the input of AND gate 37. The delay of $D_0$ substantially equals the half-period of phase-locked oscillator 23a. The other input of gate 37 is connected to the external stop input. As can be seen, only the AND condition of the external stop and the clock signal from phase-locked oscillator 23a is able to stop flip-flop FF0.

Control circuit 22a may replace control circuits 22 in FIGURES 1, 3, 4 and 5. This arrangement is particularly advantageous when highly accurate interpolation is desired.

Referring back to FIGURE 2, if the external stop pulse is assumed to come, for example, close to time $T_2$, the switching of FF2 must be timed very precisely to avoid erroneous interpolation. Due to the cumulative nature of errors in delay and switching times of the stages as hereinbefore explained, the required precision is hard to achieve.

For comparison, FIGURE 6 shows a similar situation. The external stop pulse, now at least one interpolating time quantum wide, arrives at time $T_2$. The stop command to gates G, however, is not initiated until $D_0$ time later, since flip-flop FF0 cannot be triggered until the delayed clock pulse comes into coincidence with the wide external stop pulse. This coincidence time is made to occur about half-way between two clock pulses, in the example $T_2$ and $T_3$. By utilizing control circuit 22a, the flip-flops, bistable and conditionally bistable circuits of FIGURES 1, 3, 4 and 5, therefore, can have an error accumulation up to about one-half of the interpolating time quantum without causing any errors in the interpolation.

It should be noted that in the last mentioned embodiments the multi-stable state circuit still can read a time different from the actual time interval between start and external stop pulses, but this so-called "quantizing error" never exceeds plus or minus one-half of the interpolating time quantum. Other embodiments utilizing control circuit 22 may have somewhat larger errors increased by the cumulative error hereinbefore described. However, the larger error is still less than that of conventional counting units having plus or minus one count error due to their non-coherent clock generators.

Figure 8:
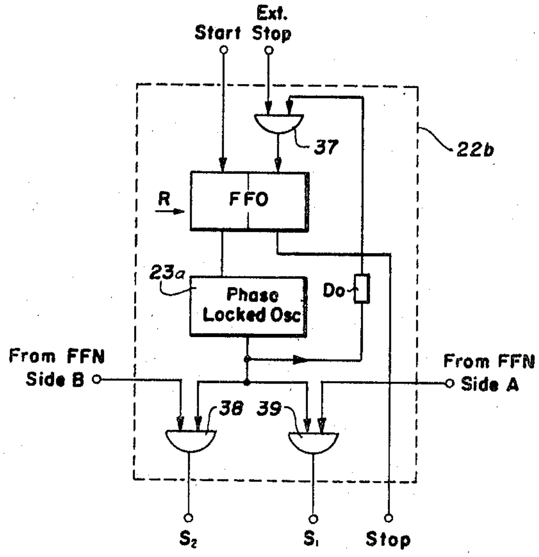
FIGURE 8 is another embodiment of a control means principally useful in the embodiment of the invention shown in FIGURE 1.

FIGURE 8 shows, by way of an example, still another embodiment of control circuit or means 22 of FIGURE 1. Circuit 22b has all the features and operation of circuit 22a. However, the divider circuit 36 is replaced by a second circuit comprised of gates 38 and 39 together with control lines from the two sides of FFN. The second circuit can also be called a divider, more particularly, a divider based on pulse selection. At start time, gate 39 will be enabled and several clock pulses will pass. Only the first of these can be effective though in triggering FFL into set condition since FF1 cannot be set again before a reset. As the sequence continues, as soon as FFN is set, gate 38 will transmit several clock pulses, but again only the first can be effective. It is seen, therefore, that control circuit 22b can replace circuit 22 and 22a in FIGURE 1 and, with appropriate modifications, also the control circuits of FIGURES 3, 4 and 5.

It is apparent from the foregoing that I have provided a new and improved digital interpolating apparatus which is particularly useful in making time interval measurements with high resolution.

I claim:

1. In a digital interpolating apparatus for making time interval measurements, a plurality of trigger circuits interconnected in an open ended chain from first to last to form a multi-stable state circuit, control means supplying a trigger pulse at the beginning of the time interval and periodically during the time interval to be measured to the first trigger circuit to cause it to be triggered changing the state of the multi-stable state circuit, each additional trigger circuit being connected to be triggered in a time ordered self-sustaining sequence by the output of the preceding trigger circuit thereby changing the state of the multi-stable state circuit sequentially, and stop means capable of inhibiting the supply of trigger pulses to said first trigger circuit to prevent its subsequent triggering, said stop means also supplying a stop signal to said additional trigger circuits causing the multi-stable state circuit to stay in the last assumed stable state.

2. In a digital interpolating apparatus for making time interval measurements, a multi-stable state circuit comprised of a plurality of stages in which each of the stages is capable of assuming two states, said stages being connected in a predetermined arrangement so that the multi-stable state circuit is capable of assuming a plurality of "$n$" stable states in a predetermined self-sustaining sequence starting from a first stable state and stopping in the $n$th stable state, control means connected to said multi-stable state circuit adapted to supply a trigger signal to said multi-stable state circuit at the beginning of and periodically during the time interval to be measured for causing said multi-stable state circuit to sequence through said predetermined sequence starting from said first stable state, and stop means connected to said multi-stable state circuit to supply a signal at the end of the time interval being measured to cause the multi-stable state circuit to stop in any one of its stable states then assumed, said multi-stable state circuit being connected so that each time it is started by said trigger signal of said control means, it passes through said sequence once, in the absence of a signal from said stop means, and remains stopped in its $n$th stable state, until the receipt of the next of said periodic trigger signals, the first stable state of the predetermined sequence being assumed in response to receipt of a signal from the control means and subsequent stable states of the multi-stable state circuit being assumed in sequence in response to the preceding stable state being assumed, means for determining the number of times said multi-stable state circuit sequences through said predetermined sequence before the multi-stable state circuit is stopped by said stop means and readout means for determining the last stable state of the multi-stable state circuit after it has been stopped.

3. Apparatus as in claim 2 wherein said control means includes a phase-locked oscillator and a flip-flop, means connected to one side of the flip-flop adapted to receive a start signal, means connected to the other side of the flip-flop adapted to receive an external stop signal, and means connecting one side of the flip-flop to the phase-locked oscillator and wherein said means connected to the multi-stable state circuit to cause the multi-stable state circuit to stop includes a conductor connected to the other side of the flip-flop and to each of the stages.

4. Apparatus as in claim 3 wherein the phase-locked oscillator has an output frequency which is related to the stepping rate of the entire multi-stable state circuit.

5. Apparatus as in claim 3 wherein the phase-locked oscillator has an output frequency which is related to the switching rate of a single stage of the multi-stable state circuit.

6. Apparatus as in claim 5 together with means for eliminating the stepping rate error including a gate having two inputs and one output and a delay element, one of the inputs of the gate being connected to the means adapted to receive an external stop signal, the other input being connected to one side of the delay element and the other side of the delay element being connected to the output of the phase-locked oscillator.

7. In a digital interpolating apparatus for making time interval measurements, a multi-stable state circuit comprised of a plurality of conditionally bistable stages, each stage being capable of assuming reset and set states, said reset state being fully stable, said set state being quasi-stable when a first bias level is applied and said set state becoming fully stable when a second bias level is applied, said multi-stable state circuit being capable of assuming a plurality of stable states in a predetermined self-sustaining sequence, each of said stages having an input and an output, coupling means connecting the output of one stage to the input of the succeeding stage, control means connected to the multi-stable state circuit, said control means including an oscillator having its output connected to the first stage, means for starting the oscillator and simultaneously causing said first bias level to be applied to all of said stages, and means adapted to change said bias to said second bias level in response to a stop signal.

References Cited

UNITED STATES PATENTS

| | | | |
|---|---|---|---|
| 2,738,461 | 3/1956 | Burbeck et al. | 324—68 |
| 2,875,333 | 2/1959 | Durnal | 328—43 |
| 3,105,195 | 9/1963 | Tarczy-Hornoch | 328—43 |
| 3,108,227 | 10/1963 | Robinson | 328—43 |

RUDOLPH V. ROLINEC, *Primary Examiner.*

PAUL F. WILLE, *Assistant Examiner.*

U.S. Cl. X.R.

328—43, 110